United States Patent [19]

Swanson

[11] 4,240,505

[45] * Dec. 23, 1980

[54] WELL ACIDIZING COMPOSITIONS AND METHODS

[75] Inventor: Billy L. Swanson, Bartlesville, Okla.

[73] Assignee: Phillips Petroleum Company, Bartlesville, Okla.

[ * ] Notice: The portion of the term of this patent subsequent to Oct. 25, 1994, has been disclaimed.

[21] Appl. No.: 902,652

[22] Filed: May 4, 1978

[51] Int. Cl.$^3$ .............................................. E21B 43/27
[52] U.S. Cl. .................................. 166/302; 166/307; 252/8.55 C; 252/316
[58] Field of Search ................. 252/8.55 C, 8.55 R, 252/316; 166/282, 307, 302

[56] References Cited

U.S. PATENT DOCUMENTS

| | | | |
|---|---|---|---|
| 2,778,427 | 1/1957 | Cardwell et al. | 252/8.55 X |
| 2,923,681 | 2/1960 | Hein et al. | 252/8.5 |
| 3,344,063 | 9/1967 | Stratton | 252/8.5 |
| 3,441,504 | 4/1969 | Browning | 252/8.5 |
| 3,897,827 | 8/1975 | Felber et al. | 166/270 |
| 3,923,666 | 12/1975 | Dill | 252/8.55 |
| 4,055,502 | 10/1977 | Swanson | 252/8.55 |
| 4,068,719 | 1/1978 | Clampitt et al. | 252/8.55 X |
| 4,068,720 | 1/1978 | Hessert et al. | 166/307 X |
| 4,110,226 | 8/1978 | Swanson | 252/8.55 X |

*Primary Examiner*—Herbert B. Guynn

[57] ABSTRACT

Gelled acidic compositions suitable for matrix acidizing or fracture acidizing of subterranean formations are provided comprising water, a water-dispersible polymeric viscosifier such as a polymer of acrylamide, an acid, and a polyphenolic material such as lignite.

22 Claims, No Drawings

WELL ACIDIZING COMPOSITIONS AND METHODS

This invention relates to gelled acidic compositions and to acid treating or acidizing of subterranean formations. In accordance with another aspect, this invention relates to gelled acidic compositions comprising thickened aqueous acid solutions prepared from a water-dispersible polymeric viscosifier, an acid, and a polyphenolic material. In accordance with another aspect, this invention relates to gelled acidic compositions suitable for either matrix acidizing or fracture acidizing of subterranean formations to enhance the efficiency of oil recovery. In accordance with a further aspect, this invention relates to gelled acidic compositions exhibiting excellent stability and reduced gelation temperatures comprising water, a water-dispersible polymer, an acid, and a polyphenolic material such as lignite.

Acid treating or acidizing of porous subterranean formations penetrated by a well bore has been widely employed for increasing the production of fluids, e.g., crude oil, natural gas, etc., from subterranean formations. The usual technique of acidizing a formation comprises introducing a nonoxidizing acid such as aqueous HCl into the well under sufficient pressure to force the acid out into the formation to react with the acid-soluble components of the formation. The technique is not limited to formations of high acid solubility such as limestone but is also applicable to other types of formations such as a sandstone containing streaks or striations of acid soluble components such as the various carbonates.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix acidizing.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

Thus, it is within the scope of the present invention to inject the gelled acidic compositions of the invention into the formation under insufficient pressure to cause fracturing of the formation and carry out a matrix acidizing operation, or inject said gelled acidic composition at sufficient rates and pressure to cause fracturing and carry out a combination fracture-acidizing operation.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent and surrounding the well bore. The severity of the problem increases as the well temperature increases because acid reactivity with the formation increases with increasing temperatures, as in deeper wells.

The term "good penetration" means penetration of live or effective acid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given acidizing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of a few feet, e.g., up to five or more, in a small volume matrix acidizing operation, and several hundred feet, e.g., up to 500 or more, in a large volume fracture-acidizing operation.

Poor penetration can also be caused, and/or aggravated, by fluid loss to the more porous zones of the formation where low permeability is not a problem. Poor penetration can also be caused, and/or aggravated, by leak-off at the fracture faces in combination fracturing-acidizing operations. Either said fluid loss or said leak-off can frequently worsen the situation by leaving the tight (low permeability) zones of the formation unchanged and merely further opening up the already high permeability zones.

One solution which has been proposed for the above-discussed problem is to incorporate various polymeric thickening or viscosifying agents into the acid solution. Said agents serve to thicken the acid solution and thus increase the viscosity thereof. It has been reported that so-thickened acid solutions have reduced fluid loss properties. For example, see U.S. Pat. No. 3,415,319 issued Dec. 10, 1968, in the name of B. L. Gibson, and U.S. Pat. No. 3,434,971 issued Mar. 25, 1969, in the name of B. L. Atkins. It has also been reported that the reaction rate of so-thickened acid solutions with the acid-soluble portions of the formation is lessened or retarded. See, for example, U.S. Pat. No. 3,749,169, issued July 31, 1973, in the name of J. F. Tate; U.S. Pat. No. 3,236,305, issued Feb. 22, 1966, in the name of C. F. Parks; and U.S. Pat. No. 3,252,904, issued May 24, 1966, in the name of N. F. Carpenter.

Higher viscosities are also advantageous in combination fracturing-acidizing operations in that the more viscous acidic solutions produce wider and longer fractures. More viscous acid solutions are also more effective in carrying propping agents into the formation when propping agents are used.

Another problem encountered in acidizing operations, particularly when employing acidizing compositions having thickening or viscosifying agents incorporated therein, is stability to heat. By stability to heat, it is meant the retention of the increased or greater viscosity properties under the conditions of use. Such compositions to be satisfactory should be sufficiently stable to resist degeneration by the heat of the formation for a period of time sufficient to accomplish the intended purpose, e.g., good penetration and significant etching of the formation. The degree of stability required in any particular operation will vary with such operating variables as the type of formation being treated, the temperature of the formation, the well depth (time to pump the acidic composition down the well and into the formation), the acid concentration in the composition, etc.

The temperature of the formation usually has a pronounced effect on the stability of the acidizing compositions and, generally speaking, is one of the most important operating variables when considering stability. Increased formation temperatures usually have at least two undesirable effects. One such effect is degeneration of the composition, e.g., decrease in viscosity. Another such effect is increased rate of reaction of the acid with the formation. Thus, some compositions which would be satisfactory in a low temperature formation such as in the Hugoton field in the Anadarko basin might not be satisfactory in formations encountered in deeper wells as in some West Texas fields.

In ordinary acidizing operations using unthickened acids there is usually no problem in removing the spent acid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation or in the fracture. This can inhibit the production of fluids from the formation and can require costly cleanup operations. It would be desirable to have gelled acidic compositions which break down to a lesser viscosity within a short time after the operation is completed.

The present invention provides a solution for, or at least mitigates, the above-discussed problems. The present invention provides improved methods for acidizing or fracture-acidizing subterranean formations and new gelled acidic compositions for use in said methods.

Accordingly, an object of this invention is to provide gelled acidic compositions that are stable and exhibit reduced gelation temperatures.

Another object of this invention is to provide gelled acidic compositions suitable for matrix acidizing.

A further object of this invention is to provide gelled acidic compositions suitable for fracture acidizing of subterranean formations.

Other objects, aspects, and the several advantages of the invention will be apparent to those skilled in the art upon a study of the disclosure and the appended claims.

In accordance with the invention, gelled acidic compositions are provided comprising water, a water-dispersible polymeric viscosifier selected from cellulose ethers, acrylamide polymers, polyalkylene oxides, polyvinyl alcohols, and polyvinylpyrrolidones, an acid, and a polyphenolic material such as lignite.

Further, in accordance with the invention, there is provided a method for acid treating a porous subterranean formation susceptible to attack by an acid and penetrated by a well bore which comprises injecting into the formation a gelled acidic composition comprising water, a water-dispersible polymer as defined herein, an acid, and a polyphenolic material such as lignite and maintaining the gelled acidic composition in the formation for a period of time sufficient for the acid in the composition to react significantly with the acid-soluble components in the formation and stimulate the production of fluids therefrom.

In accordance with a specific embodiment of the invention, a method for preparing said gelled acidic composition is provided comprising dissolving a water-thickening amount of a water-dispersible polymer to form a polymer-thickened aqueous solution, mixing the polymeric thickened aqueous solution with an alkaline solution of a polyphenolic material such as lignite and quebracho, and adding sufficient acid to the resulting solution to cause gelation and form a strongly acidic gelled composition.

It has been found in the preparation of the instant acidic gelled compositions that the polyphenolic compound can be effectively incorporated into the gellable composition if causticized or alkaline lignite or quebracho polyphenolic components are used without having to subject the gellable composition to heat or other treatment to effect gelation.

Herein and in the claims, unless otherwise specified, the term "polymeric viscosifier" is employed generically to include both homopolymer and copolymer viscosifiers; and the term "water-dispersible polymers" is employed generically to include those polymers which are truly water-soluble and those polymers which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled as described herein.

Polymers suitable for use in the present invention are selected from polyacrylamides, cellulose ethers, polyalkylene oxides, polyvinyl alcohols, and polyvinylpyrrolidones, as well as mixtures thereof.

Any suitable polymer of acrylamide meeting the above-stated compatibility requirements can be used in the practice of the invention. Thus, under proper conditions of use, such polymers can include various polyacrylamides and related polymers which are water-dispersible and which can be used in an aqueous medium, with the gelling agents described herein, to give an aqueous gel. These can include the various substantially linear homopolymers and copolymers of acrylamide and methacrylamide. By substantially linear it is meant that the polymers are substantially free of crosslinking between the polymer chains. Said polymers can have up to about 45, preferably up to about 40, percent of the carboxamide groups hydrolyzed to carboxyl groups. Generally speaking, as the degree of hydrolysis increases, the polymers tend to become more difficult to disperse in aqueous acidic media. Thus, one presently more preferred group of polymers include those wherein not more than about 20 percent of the carboxamide groups are hydrolyzed. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Under proper conditions of use, examples of copolymers which can be used in the practice of the invention can include the water-dispersible copolymers resulting from the polymerization of acrylamide or methacrylamide with selected ethylenically unsaturated monomer copolymerizable therewith. It is desirable that sufficient acrylamide or methacrylamide be present in the monomers mixture to impart to the resulting copolymer the above-described water-dispersible properties. Any suitable ratio of monomers meeting this condition can be used. Under proper conditions of use, examples of suitable ethylenically unsaturated monomers can include acrylic acid, methacrylic acid, vinyl-sulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl-substituted cationic quaternary ammonium compounds, and the like. Various methods are known in the art for preparing said copolymers. Teachings with respect to such polymers are found in U.S. Pat. No. 2,625,529, issued Jan. 13, 1953, to R. M. Hedrick; U.S. Pat. No. 2,740,522, issued Apr. 3, 1956, to F. M. Aimone et al; U.S. Pat. No. 2,727,557, issued Dec. 20, 1955, to R. L. Fox; U.S. Pat. No. 2,831,841, issued Apr. 22, 1958, to G. D. Jones; U.S. Pat. No. 2,909,508, issued Oct. 20, 1959, to G. D. Jones; U.S. Pat. No. 3,507,707, issued Apr. 14, 1970, to L. E. Miller et al; U.S. Pat. No. 3,768,565, issued Oct. 30, 1973, to L. J. Persinski et al; and U.S. Pat. No. 3,573,263, issued Mar. 30, 1971, to E. A. Gill. The above references are herein incorporated by reference.

All the polymers useful in the practice of the invention are characterized by high molecular weight. The molecular weight is not critical so long as the polymer has the above-described water-dispersible properties and meets the above-stated compatibility requirements. It is preferred that the polymers have a molecular weight of at least 100,000, more preferably at least about 2,000,000. The upper limit of molecular weight is unimportant so long as the polymer is water-dispersible, and the gelled acidic composition therefrom can be pumped. Thus, it is within the scope of the invention to use polymers having molecular weights as high as 20,000,000 or higher and meeting said conditions.

The amount of the above-described polymers used in preparing the gelled acidic compositions of the invention can vary widely depending upon the particular polymer used, the purity of said polymer, and properties desired in said compositions. In general, the amount of polymer used will be a water-thickening amount, e.g., at least an amount which will significantly thicken the water to which it is added. For example, amounts in the order of 25 to 100 parts per million by weight (0.0025 to 0.01 weight percent) have been found to significantly thicken water. Distilled water containing 25 ppm of a polymer of acrylamide having a molecular weight of about $10 \times 10^6$ had a viscosity increase of about 41 percent. At 50 ppm the viscosity increase was about 106 percent. At 100 ppm the viscosity increase was about 347 percent. As another example, distilled water containing 25 ppm of a polymer of acrylamide having a molecular weight of about $3.5 \times 10^6$ had a viscosity increase of about 23 percent. At 50 ppm the viscosity increase was about 82 percent. At 100 ppm the viscosity increase was about 241 percent. Generally speaking, amounts of the above-described polymers in the range of from 0.2 to 3, preferably from 0.3 to about 2, weight percent, based on the total weight of the composition, can be used in preparing gelled acidic compositions for use in the practice of the invention.

Similarly, when the polymer used is a partially hydrolyzed polyacrylamide or polymethacrylamide, the polymer concentration will preferably be in the range of from 0.10 to about 3 weight percent, preferably about one weight percent based on the total weight of the composition. However, it is within the scope of the invention to use amounts outside said ranges. In general, with the proper amounts of acid, the amount of polymer used will determine the consistency of the gel obtained. Small amounts of polymer will usually produce liquid mobile gels which can be readily pumped. Large amounts of polymer will usually produce thicker, more viscous, somewhat elastic gels. Gels having a viscosity "too thick to measure" by conventional methods can still be used in the practice of the invention. Thus, there is really no fixed upper limit on the amount of polymer which can be used so long as the gelled acidic composition can be pumped in accordance with the methods of the invention.

In general, any of the water-soluble cellulose ethers can be used to prepare the aqueous gels used in the practice of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC), hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to, and they are commonly referred to as CMC for carboxymethyl cellulose, CMHEC for carboxymethyl hydroxyethyl cellulose, etc. For example, water-soluble CMC is commercially available in various degrees of carboxylate substitution ranging from about 0.3 up to the maximum degree of substitution of 1.6. In general, CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

The amount of cellulose ether used in preparing the aqueous gels used in the practice of the invention can vary widely depending upon the viscosity grade and purity of the ether, and properties desired in said aqueous gels. In general, the amount of cellulose ether used will be a water-thickening amount, i.e., at least an amount which will significantly thicken the water to which it is added. For example, amounts in the order of 25 to 100 parts per million weight (0.0025 to 0.01 weight percent) have been found to significantly thicken water. Water containing 25 ppm of CMC has a viscosity increase of about 21 percent. At 50 ppm the viscosity increase is about 45 percent. At 100 ppm the viscosity increase is about 195 percent. Generally speaking, amounts in the range of from 0.0025 to 20, preferably from 0.01 to 5, more preferably 0.025 to 1, weight percent, based on the weight of water, can be used. However, amounts outside said ranges can be used.

Other polymers that can be used in the practice of the invention include polyalkylene oxide, polyvinyl alcohol, and polyvinylpyrrolidone, all of which are known in the art and can be prepared by methods known in the art. These polymers can be prepared, respectively, as described in U.S. Pat. Nos. 2,674,619; 2,335,454; and 3,079,337 (see references cited therein at column 3, lines 45-48). The amounts of these polymers used in the gelled compositions will ordinarily range from about 0.1 to about 10 weight percent, but in some instances lesser or greater amounts can be used.

Acids useful in the practice of the invention include any acid meeting the above-stated compatibility requirements and which is effective in increasing the flow of fluids, e.g., hydrocarbons, through the formation and into the well. Thus, under proper conditions of use, examples of such acids can include inorganic acids such as hydrochloric acid, phosphoric acid, nitric acid, and sulfuric acid; $C_1$-$C_4$ organic acids such as formic acid, acetic acid, propionic acid, butyric acid, and mixtures thereof, and combinations of inorganic and organic acids. The nonoxidizing acids are preferred. The concentration or strength of the acid can vary depending upon the type of acid, the type of formation being treated, the above-stated compatibility requirements, and the results desired in the particular treating operation. Generally speaking, the concentration can vary from 0.1 to about 15 weight percent, depending upon the type of acid, with concentrations within the range of 1 to 10 weight percent usually preferred, based upon the total weight of the gelled acidic composition. When an inorganic acid such as hydrochloric acid is used, it is presently preferred to use an amount which is sufficient to provide an amount of HCl within the range of from 1.0 to about 10.0, more preferably at least about 2.0, weight percent based on the total weight of the gelled acidic composition. Amounts within the range of about 2 to about 5 weight percent will frequently be practical amounts to use. The acids used in the practice of the invention can contain any of the known corrosion inhibitors, deemulsifying agents, sequestering agents, surfactants, friction reducers, etc., known in the art, and which meet the above-stated compatibility requirements.

Suitable concentration ranges for the various components in the inventive gelled composition when lignite is used as the polyphenolic compound are summarized below:

| | Lignite-Containing Gelled Compositions | | | | |
|---|---|---|---|---|---|
| | Wt. % | Wt. % Lignite | | Wt. % Acid | |
| Polymer | Polymer | Broad | Preferred | Broad | Preferred |
| Polyacrylamide | 0.1-3.0 | 0.05-3.0 | 0.1-0.5 | 0.1-15 | 1.0-10.0 |
| Cellulose ethers* | 0.1-3.0 | 0.01-3.0 | 0.1-0.8 | 0.1-15 | 1.0-10.0 |
| Polyalkylene oxides | 0.1-3.0 | 0.4-3.0 | 0.6-1.0 | 0.1-15 | 1.0-10.0 |
| Acrylamide-AMPS** Copolymers | 0.1-3.0 | 0.75-3.0 | 1.0-2.0 | 0.1-15 | 1.0-10.0 |
| Polyvinyl alcohol | 1.0-10.0 | 0.5-3.0 | 1.0-2.0 | 0.1-15 | 1.0-10.0 |
| Polyvinyl pyrrolidone | 1.0-10.0 | 0.5-3.0 | 1.0-2.0 | 0.1-15 | 1.0-10.0 |

| | Lignite-Containing Gelled Compositions | | | | |
|---|---|---|---|---|---|
| | Wt. % | Wt. % Lignite | | Wt. % Acid | |
| Polymer | Polymer | Broad | Preferred | Broad | Preferred |
| | 10.0 | | | | 10.0 |

*The MS (based on moles of hydroxyethyl groups per anhydroglucose unit) of suitable polyethoxylated cellulose ethers should be in the range of 0.5 to 5.0, preferably 1.0 to 3.0.
**The AMPS monomer is 2-acrylamido-2-methylpropanesulfonic acid.

Although various forms of lignite can be used, the preferred form suitable for use in the inventive compositions is more correctly called leonardite. Leonardite is a soft, earthy, medium brown, coal-like substance which is mined commercially. Leonardite has higher oxygen content than other types of lignite which may be due to the larger number of carboxylic acid groups present. Infrared spectral analysis indicate that leonardite contains mixed salts of humic acids.

A typical solubility of conventional lignite is 66⅔ weight percent in alkali whereas leonardite has a solubility of about 85 weight percent. Lignite of 66⅔ weight percent alkali solubility may have an analysis of 15 percent moisture, 51.7 percent humic acid, and 33.3 percent residue, whereas a leonardite of 85 weight percent solubility consists of 13.5 percent moisture, 71.5 percent humic acids, and 15 percent residue.

The gelled acidic compositions of the invention are aqueous compositions. They normally contain a significant amount of water. The amount of said water can vary widely depending upon the concentrations of the other components in the compositions, particularly the concentration of the acid. For example, if an organic acid such as acetic acid is used in a concentration of 10 weight percent, the amount of water present in the composition clearly will be more than when an inorganic acid such as HCl is used in the maximum concentration of about 15 weight percent. Thus, while no precise overall range of water content can be set forth, based on the above-stated overall ranges for the concentrations of said other components, the water content of said compositions can be in the range of from about 80 to about 99, frequently about 85 to 95, weight percent. However, amounts of water outside said ranges can be used.

Propping agents can be included in the gelled acidic compositions of the invention if desired. Propping agents which can be used include any of those known in the art, e.g., said grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed. When propping agents are used, they should be made of materials which are not severely attacked by the acid used during the time they are exposed to said acid.

Any suitable method can be employed for preparing the gelled acidic compositions of the invention. Thus, any suitable mixing technique or order of addition of the components of said composition to each other can be employed which will provide a composition having sufficient stability to degeneration by the heat of the formation (in which the composition is to be used) to permit good penetration of the composition into, and significant etching of, said formation. However, it is preferable to first dissolve or disperse the polymer in water before contacting the polymer solution with the polyphenolic material and sufficient alkali to solubilize said polyphenolic before addition of acid to effect gelation. The addition of alkali is not necessary if the causticized form of the polyphenolic is used. Preferably the acid component is added to a rapidly stirred aqueous alkaline mixture of polymer and polyphenolic component. It is within the scope of the invention to moisten or slurry the polymer with a small amount, e.g., about one to about six weight percent, based on the weight of the polymer, of a low molecular alcohol, e.g., $C_1$ to $C_3$ alcohols, as a dispersion aid prior to dispersing the polymer in water. It is preferred that there be no undue delay between completing the preparation of the gelled acidic composition and its introduction into contact with the formation.

The gelled acidic composition of the invention can be prepared on the surface in a suitable tank equipped with suitable mixing means, and then pumped down the wall and into the formation employing conventional equipment for pumping acidic compositions. However, it is within the scope of the invention to prepare said compositions while they are being pumped down the well. This technique is sometimes referred to as "on the fly." For example, an aqueous alkaline solution of the polymer and polyphenolic material can be prepared in a tank adjacent the well head. Pumping of this solution through a conduit to the well head can be started. Then, a few feet downstream from the tank a suitable connection can be provided for introducing the acid into said conduit, preferably as an aqueous solution. As will be understood by those skilled in the art, the rate of introduction of said components into said conduit will depend upon the pumping rate of the thickened alkaline polyphenolic solution through said conduit. Mixing orifices can be provided in said conduit, if desired.

As indicated above, in a specific embodiment of the invention, the gelled compositions of the invention are prepared using alkaline polyphenolic solutions in order to effect gelation when combined with water, a water-dispersible polymeric viscosifier, and the acid. Suitable alkaline materials that can be used include the hydroxides of alkali metals, ammonia, and alkaline earth metals. The pH of the polyphenolic solution is preferably in the range of 9 to 11. It has been found, as noted above, that both quebracho and lignite can be effectively incorporated into the gelled compositions in this manner.

Suitable concentration ranges for the various compositions in the inventive gelled compositions when quebracho is used are summarized below.

| Quebracho-Containing Gelled Compositions | | | | | |
|---|---|---|---|---|---|
| Polymer | Wt. % Polymer | DSM of the Polyphenolic* | Wt. Percent Quebracho or SMQ | | Wt. % Acid |
| | | | Broad | Preferred | |
| Cellulose ethers[a] | 0.1–3.0 | 0–80 | 0.5–3.0 | 0.1–1.0 | 1.0–10.0 |
| Polyvinyl alcohol | 1.0–10.0 | 0–80 | 0.5–3.0 | 1.0–2.0 | 1.0–10.0 |
| Polyvinyl pyrrolidone | 1.0–10.0 | 0–80 | 0.5–3.0 | 1.0–2.0 | 1.0–10.0 |
| Polyalkylene oxides | 0.1–3.0 | 0–80 | 0.5–3.0 | 1.0–2.0 | 1.0–10.0 |

*DSM represents "degree of sulfomethylation" and is defined as the number of grams of bisulfite-formaldehyde addition compound reacted with each 200 grams of polyphenolic material such as quebracho.
[a]If the DSM is greater than zero, then the cellulose ethers are limited to those possessing an MS (molar substitution of hydroxyethyl groups per anhydroglucose unit) in the range of 0.5 to 5.0, preferably in the range of 1.0 to 3.0.

Quebracho is a suitable flavotannin polyphenolic material for use in the practice of the invention. Quebracho is flavotannin which is water-extracted from the bark and wood of the quebracho tree. The conventional method of preparing quebracho is to disintegrate the wood and bark followed by extraction with water. The aqueous extract is concentrated to remove about 85 percent of the water and the residual quebracho is spray dried. Quebracho is the commercial catechol tannin or flavotannin product. Other flavotannins which can be used are briefly described in U.S. Pat. No. 3,344,063 (column 3).

The following examples will serve to further illustrate the invention, but should not be considered as unduly limiting on the invention. In carrying out the examples the following general procedure was employed.

A 1.5 weight percent stock solution of polymer was prepared at ambient temperature in deionized water. A 133.0 ml portion of this stock solution was mixed with 51 ml of water and causticized lignite or quebracho as the polyphenolic component. If non-causticized lignite or quebracho is used, approximately 0.25 g of NaOH is added to facilitate dispersion and/or solution. In most runs, it was found convenient to use the polyphenolics which are commercially available in the causticized form. Sulfomethylated quebracho and sulfomethylated lignite were also found useful in the inventive gelling systems. High speed mixing of the thickened aqueous test samples was effected in pint jars with a Hamilton Beach Maltmixer because gels usually formed rapidly on addition of the acid. In a representative run, the volume of concentrated HCl added was 13.6 ml with an additional 0.4 ml added to samples treated with NaOH. The final concentrations of components in many of the gelled compositions were about 1 weight percent polymer, 3 weight percent HCl, and about 0.5 weight percent polyphenolic.

The jars containing the test samples were placed in a water bath at 100° F. and sufficient heat was applied such that the temperature reached 140° F. to 150° F. in one hour. Bath temperatures and observations of gel quality were recorded during this period of heating. The results are tabulated in the examples presented hereinbelow.

The water solubility of both quebracho or lignite can be increased by the addition of alkali as noted above or by the process of sulfomethylation which involves treatment of the polyphenolic with the formaldehyde bisulfite addition product. The degree of sulfomethylation, as is well known in the art, is defined as the number of grams of formaldehyde-bisulfite product reacted with 200 grams of quebracho. The laboratory sulfomethylation modifications were carried out in accordance with the procedure disclosed in the first paragraph of Example I in U.S. Pat. No. 3,344,063.

EXAMPLE I

The following results in Table I describe selected runs carried out on the system water-polyacrylamide-lignite-acid.

TABLE I

Gelled Compositions Containing One Weight Percent Polymer and Three Weight Percent HCl

| Polyacrylamide | Wt. % Lignite | Observations |
|---|---|---|
| Reten 420[a] | 0.1250 | Gelation occurred over the range of ambient temperature to about 145° F. |
| | 0.2500 | |
| | 0.3750 | |
| | 0.5000 | This gel weakened at 125° F. evidently because of an over-treatment with lignite. |

[a]Reten 420 is acrylamide homopolymer available from Hercules, Inc.

The gels produced in the first three runs above maintained an elastic characteristic in the temperature range of about 125° F. to about 145° F. The first two runs showed no sign of weakening during the heating period. The third run weakened slightly. The Reten 420-lignite gels were observed to be shear-thickening, i.e., the consistency increased on stirring.

EXAMPLE II

The following results in Table II describe selected runs carried out on the system water-cellulose ether-lignite-acid.

TABLE II

Gelled Compositions Containing One Weight Percent Polymer and Three Weight Percent HCl

| Cellulose Ether | Wt. % Lignite | Observations |
|---|---|---|
| Hydroxyethyl Cellulose (HEC)[a] | 0.1250 | |
| | 0.2500 | Gelation occurred at ambient temperature and gels remained elastic to 120° F. before breaking at about 150° F. |
| | 0.3750 | |
| | 0.5000 | |
| | 0.6250 | |
| | 0.7500 | |
| | 0.8750 | Gelation occurred at ambient temperature and gels remained elastic to 121° F. before breaking at about 127° F. |
| | 1.0000 | |
| Carboxymethyl-hydroxyethyl Cellulose (CMHEC)[b] | 0.1250 | |
| | 0.2500 | |
| | 0.3750 | Gelation occurred at ambient temperature and gels remained elastic to about 145° F. before breaking at about 150° F. |
| | 0.5000 | |
| | 0.6250 | |
| | 0.7500 | |
| | 0.8750 | |
| | 1.0000 | |
| Carboxymethyl Cellulose (CMC)[c] | 0.1250 | Mixture was thick over the range of ambient temperature to about 112° F. |
| | 0.2500 | |
| | 0.3750 | Elastic gel From ambient temperature to 112° F. |
| | 0.5000 | |
| | 0.6250 | Elastic gel from ambient temperature to 134° F. before breaking at about 140° F. |
| | 0.7500 | |
| | 0.8750 | |
| | 1.000 | Elastic gel from ambient temperature at 115° F. before breaking at about 120° F. |

[a]The HEC used was Natrosol 250 HHW available from Hercules, Inc.
[b]The carboxymethylhydroxyethyl cellulose used was CHMEC-420 possessing a degree of substitution (D.S.) equal to 0.4 and a hydroxyethyl molar substitution (M.S.) equal to 2.0.
[c]The carboxymethylcellulose used was CMC-9 as described hereinabove.

The above runs demonstrate that the cellulose ethers containing the polyethoxy groups (HEC and CHMEC) gel at slightly lower lignite levels and the elastic gels break at slightly higher temperature than the carboxymethyl cellulose (CMC) compositions.

EXAMPLE III

The following results in Table III describe selected runs carried out on the system water-polyalkylene oxide-lignite-acid.

TABLE III

Gelled Compositions Containing One Weight Percent Polymer and Three Weight Percent HCl

| Polyalkylene Oxide | Wt. % Lignite | Observations |
|---|---|---|
| Polyox WSR-301[a] | 0.5000 | Gelled at ambient temperature and remained elastic to about 100° F. before breaking at about 115° F. |
| | 0.6250 | |
| | 0.7500 | Gelled at ambient temperature and remained elastic to about 112° F. before breaking at about 120° F. |
| | 0.8750 | |
| | 1.0000 | |

[a]Polyox WSR-301 is a homopolymer of ethylene oxide available from Union Carbide Chemical Co.

The gels produced in the above runs required higher lignite levels and appeared to be less thermally stable than those from the polyethoxylated cellulose ethers (HEC and CMHEC) of Table II.

EXAMPLE IV

In accordance with the general procedure of the present invention, a system comprising water, about one weight percent quebracho, and one weight percent polyvinylpyrrolidone gave a good gel on addition of hydrochloric acid.

EXAMPLE V

In accordance with the general procedure of the present invention, a system comprising water, about one weight percent causticized leonardite (a lignite), and one weight percent of four weight percent polyvinylpyrrolidone gave good gels on addition of hydrochloric acid.

EXAMPLE VI

In accordance with the general procedure of the present invention, a system comprising water, about two weight percent causticized leonardite (a lignite), and four weight percent polyvinyl alcohol gave a good gel on addition of hydrochloric acid.

EXAMPLE VII

In accordance with the general procedure of the present invention, a system comprising water, about two weight percent sulfomethylated quebracho (SMQ with a DSM of 35), and four weight percent polyvinyl alcohol gave a good gel on addition of hydrochloric acid.

EXAMPLE VIII

In accordance with the general procedure of the present invention, a system comprising water, about 0.5 weight percent quebracho, and one weight percent Reten 420 gave a good firm gel on addition of hydrochloric acid. The gel was stable up to a temperature of about 152° F.

EXAMPLE IX

In accordance with the general procedure of the present invention, a system comprising water, about 0.5 weight percent sulfomethylated quebracho (SMQ with a DSM of 10), and one weight percent Reten 420 gave a good gel on the addition of hydrochloric acid. The gel was stable up to a temperature of about 144° F.

In a similar manner a gel was prepared with SMQ having a DSM of 20. This gel remained firm over the temperature range of 104° F. to 144° F.

Additional SMQ runs were carried out, respectively, with materials having DSM values of 35 and 70. The latter system failed to gel whereas the SMQ having a DSM of 35 gave a system which gave a weak elastic gel. This gel remained weak and elastic to 120° F.–121° F. and broke at 126° F.

In general, the most desirable quebracho-type material for gelling Reten 420 has a DSM in the range of 0 to 25.

EXAMPLE X

In accordance with the general procedure of the present invention, gels of hydroxyethyl cellulose (HEC, Natrosol 250 HHW) and carboxymethylhydroxyethyl cellulose (CMHEC-420) were prepared by using quebracho samples having DSM values of 0 to about 80. The systems studied involved the use of one weight percent polymer, 0.5 weight percent quebracho, and sufficient hydrochloric acid to give a concentration of about three weight percent HCl in the final composition.

In the hydroxyethyl cellulose systems, the gels prepared with quebracho having DSM values of 0, 20, 35, and 70 were stable up to temperatures in the range of 135° F. to 140° F. The run in which quebracho having a DSM of 85 was used gave a thick foamy fluid.

In the carboxymethylhydroxyethyl cellulose systems, the gels prepared with quebracho having DSM values of 0, 10, 20, 35, and 70 were stable up to temperatures in the range of 135° F. to 145° F.

It is within the scope of the invention to precede the injection of the gelled acidic composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease in the order of 100° F. to 250° F.

I claim:

1. An acidic gelled composition suitable for matrix acidizing or fracture acidizing of a porous subterranean formation susceptible to attack by an acid formed upon admixing
   (a) water,
   (b) a water-thickening amount of a water-dispersible polymeric viscosifier selected from the group consisting of acrylamide polymers, cellulose ethers, polyalkylene oxides, polyvinyl alcohol, and polyvinylpyrrolidone,
   (c) a small, but effective amount of a polyphenolic material selected from the group consisting of lignite, causticized lignite, and sulfomethylated lignite, and
   (d) a small, but effective amount of an acid sufficient to cause gelation and to produce a strongly acidic gelled composition, said acid being effective for dissolving at least a portion of a formation; said polymer, said acid, and said polyphenolic material in amounts used being sufficiently compatible with each other in an aqueous dispersion thereof to permit gelation of said acidic gelled composition.

2. A composition according to claim 1 wherein (b) is polyvinyl alcohol or polyvinylpyrrolidone and the amount of (b) is in the range of 1 to 10 weight percent, the amount of (c) is in the range of about 0.5 to 3 weight percent, and the amount of (d) is in the range of 0.1 to 15 weight percent.

3. A composition according to claim 1 wherein (b) is a cellulose ether and the amount of (b) is in the range of 0.1 to 3 weight percent and the amount of (c) is in the range of 0.01 to 3 weight percent.

4. A composition according to claim 1 wherein the polymeric viscosifier is an acrylamide polymer and the amount of polymer is in the range of about 0.1 to 3 weight percent and the amount of (c) is in the range of about 0.05 to 3 weight percent.

5. A process for matrix acidizing a porous subterranean formation susceptible to attack by an acid and penetrated by at least one well bore which comprises
   (a) injecting into said formation an acidic gelled composition according to claim 1 in an amount and at a pressure insufficient to create cracks or fractures in the formation,
   (b) allowing the acidic gelled composition to remain in the formation for a period of time sufficient to etch the formation passageways contacted by said composition, thus stimulating the subsequent production of fluids therefrom.
   (c) removing the acidic gelled composition from said formation, and
   (d) producing fluids from the thus-treated formation.

6. A process according to claim 5 wherein the formation is precooled prior to injection of the gelled composition by contacting with a cooling medium.

7. A process for the fracture acidizing of a porous subterranean formation susceptible to attack by an acid and penetrated by at least one well bore which comprises
   (a) injecting into said formation an acidic gelled composition according to claim 1 at a rate and pressure sufficient to cause fracturing of said formation.
   (b) allowing said acidic gelled composition to remain in the formation for a period of time sufficient to etch the formation passageways contacted by said composition, thus stimulating subsequent production of fluids therefrom,
   (c) removing the acidic gelled composition from said formation, and
   (d) producing fluids from the thus-treated formation.

8. A process according to claim 7 wherein propping agents are added to said gelled composition prior to introduction into a subterranean formation.

9. A process according to claim 7 wherein the formation is precooled prior to injection of the gelled composition by contacting with a cooling medium.

10. A method for producing acidic gelled compositions which comprises
  (a) dissolving a water-thickening amount of a water dispersible polymer selected from the group consisting of acrylamide polymers, cellulose ethers, polyvinyl alcohol, polyvinylpyrrolidone, and polyalkylene oxides in water to form a polymer-thickened aqueous solution,
  (b) contacting the polymer solution of (a) with a small, but effective amount of lignite and sufficient alkaline material to solubilize said lignite in said polymer solution, and
  (c) adding an acid which is effective to dissolve at least a portion of a subterranean formation to the resulting thickened solution of (b) in an amount sufficient to cause gelation and form a strongly acidic gelled composition.

11. A method according to claim 10 wherein said polymer is an acrylamide polymer or cellulose ether.

12. A method according to claim 11 wherein said water-dispersible polymer is an acrylamide polymer and the amount of polymer present ranges from 0.1 to 3 weight percent, the amount of lignite present ranges from 0.05 to 3 weight percent, and the amount of acid present ranges from 0.1 to 15 weight percent of the acidic gelled composition.

13. A method according to claim 10 wherein said polymer is a cellulose ether and the amount of polymer present ranges from 0.1 to 3 weight percent, the amount of lignite ranges from 0.01 to 3 weight percent, and the amount of acid present ranges from 0.1 to 15 weight percent of the acidic gelled composition.

14. An acidic gelled composition suitable for matrix acidizing or fracturing acidizing of a porous subterranean formation susceptible to attack by an acid formed upon admixing
  (a) water, (b) a water-thickening amount of a water-dispersible polymeric viscosifier selected from the group consisting of cellulose ethers, polyalkylene oxides, polyvinyl alcohol, and polyvinylpyrrolidone,
  (c) a small, but effective amount of a flavotannin selected from the group consisting of quebracho, sulfomethylated quebracho, and causticized quebracho, and
  (d) a small, but effective amount of an acid sufficient to cause gelation and to produce a strongly acidic gelled composition, said acid being effective for dissolving at least a portion of a formation; said polymer, said acid, and said flavotannin in amounts used being sufficiently compatible with each other in an aqueous dispersion thereof to permit gelation of said acidic gelled composition.

15. A composition according to claim 14 wherein (b) is polyvinyl alcohol or polyvinylpyrrolidone and the amount of (b) is in the range of 1 to 10 weight percent, the amount of (c) is in the range of about 0.5 to 3 weight percent, and the amount of (d) is in the range of 1 to 10 weight percent.

16. A composition according to claim 14 wherein (b) is a cellulose ether and the amount of (b) present ranges from 0.1 to 3 weight percent, the amount of (c) present ranges from 0.05 to 3 weight percent, and the amount of acid present ranges from 1 to 10 weight percent.

17. A composition according to claim 14 wherein the polymeric viscosifier is a cellulose ether and the flavotannin is a sulfomethylated quebracho with a DSM of 20 to 70.

18. A composition according to claim 14 wherein (b) is a polyalkylene oxide polymer and the amount of (b) present ranges from 0.1 to 3 weight percent, the amount of (c) ranges from 0.5 to 3 weight percent, and the amount of acid ranges from 1 to 10 weight percent.

19. A method for producing acidic gelled compositions which comprises
  (a) dissolving a water-thickening amount of a water-dispersible polymer selected from the group consisting of acrylamide polymers, cellulose ethers, polyvinyl alcohol, polyvinylpyrrolidone, and polyalkylene oxides in water to form a polymer-thickened aqueous solution,
  (b) contacting the polymer solution of (a) with a small, but effective amount of selected from the group consisting of quebracho quebracho and sufficient alkaline material to solubilize said quebracho in said polymer solution, and
  (c) adding an acid which is effective to dissolve at least a portion of a subterranean formation to the resulting thickened solution of (b) in an amount sufficient to cause gelation and form a strongly acidic gelled composition.

20. A method according to claim 19 wherein said polymer is polyvinyl alcohol or polyvinylpyrrolidone and the amount of polymer present ranges from 1 to 10 weight percent, the amount of flavotannin ranges from 0.3 to 3 weight percent, and the amount of acid present ranges from 1 to 10 weight percent of the acidic gelled composition.

21. A method according to claim 19 wherein said polymer is a cellulose ether and the amount of said polymer present ranges from 0.1 to 3 weight percent, the amount of quebracho present ranges from 0.05 to 3 weight percent, and the amount of acid present ranges from 1 to 10 weight percent.

22. A method according to claim 19 wherein said water dispersible polymer is an acrylamide polymer or cellulose ether.

* * * * *